Feb. 14, 1967 E. A. DAHL, JR 3,303,848

TAPE FILE APPARATUS

Filed July 3, 1963 2 Sheets-Sheet 1

INVENTOR.
Ernest A. Dahl, Jr.
BY Olson, Trexler
Wolters & Bushnell
attys.

Feb. 14, 1967 E. A. DAHL, JR 3,303,848

TAPE FILE APPARATUS

Filed July 3, 1963 2 Sheets-Sheet 2

INVENTOR.

Ernest A. Dahl, Jr.

BY Olson, Trexler, Wolters & Bushnell attys.

3,303,848
TAPE FILE APPARATUS
Ernest A. Dahl, Jr., 729 Greenwood Ave., Wilmette, Ill. 60091
Filed July 3, 1963, Ser. No. 292,650
4 Claims. (Cl. 129—16)

This invention pertains to structure for magnetically assisted filing and relates particularly to improved apparatus for filing business machine-tapes for easy retrieval.

Certain information handling machines known to the art employ thin, ribbon-like tapes having information storing indicia thereon written in "machine language." Not infrequently business organizations employ machine programs utilizing a great plurality of tapes, each tape being relatively short in length and relating to a particular feature of such program.

A machine operator undertaking the execution of such a machine program must necessarily handle each tape as it is placed in the machine and taken therefrom, the operator having previously identified each tape in accordance with the machine program. To achieve increased output of the machine per operator man-hour it is desirable that the machine-tapes be readily identifiable, easily filed and retrievable.

Machine-tapes are frequently made from paper material and for this reason are easily foldable for storage to await subsequent use. Also to be understood is that paper tape tends to be flimsy and easily damaged, and where a group of similar tapes are involved there exists a problem in efficiently arranging stored tapes.

Accordingly, it is an object of this invention to provide a magnetically assisted tape file obviating the above noted defects.

Another object is to provide improved apparatus for expediciously filing a plurality of business machine-tapes for easy access, survey and retrieval.

Still another object of the invention is to provide apparatus of the class described wherein a plurality of tape-receiving locations are easily accessible for inserting and withdrawing tapes.

Yet another object is to provide apparatus according to the foregoing objects wherein tapes may be conveniently arranged to reduce the possibility of twisting, crushing, or otherwise deforming the machine-tapes.

Still another object is to provide a file for holding machine-tapes wherein such tapes may be received in a tape-receiving pocket openable for access in response to magnetic forces.

A further object of this invention is to provide an improved file for narrow, thin machine-tapes, which file is simple in design and construction, highly practical in use, economical to manufacture, and which is adapted to increase the machine operator's efficiency.

Further features of the invention pertain to the arrangement of the tape file apparatus whereby the above-outlined and additional operating features are attained.

The invention, both as to its organization and method of operation, together with further objects and advantages, will best be understood by reference to the following specification taken in connection with the accompanying drawings wherein like reference numerals designate like parts throughout, in which.

Figures 1, 2, 3, 4:
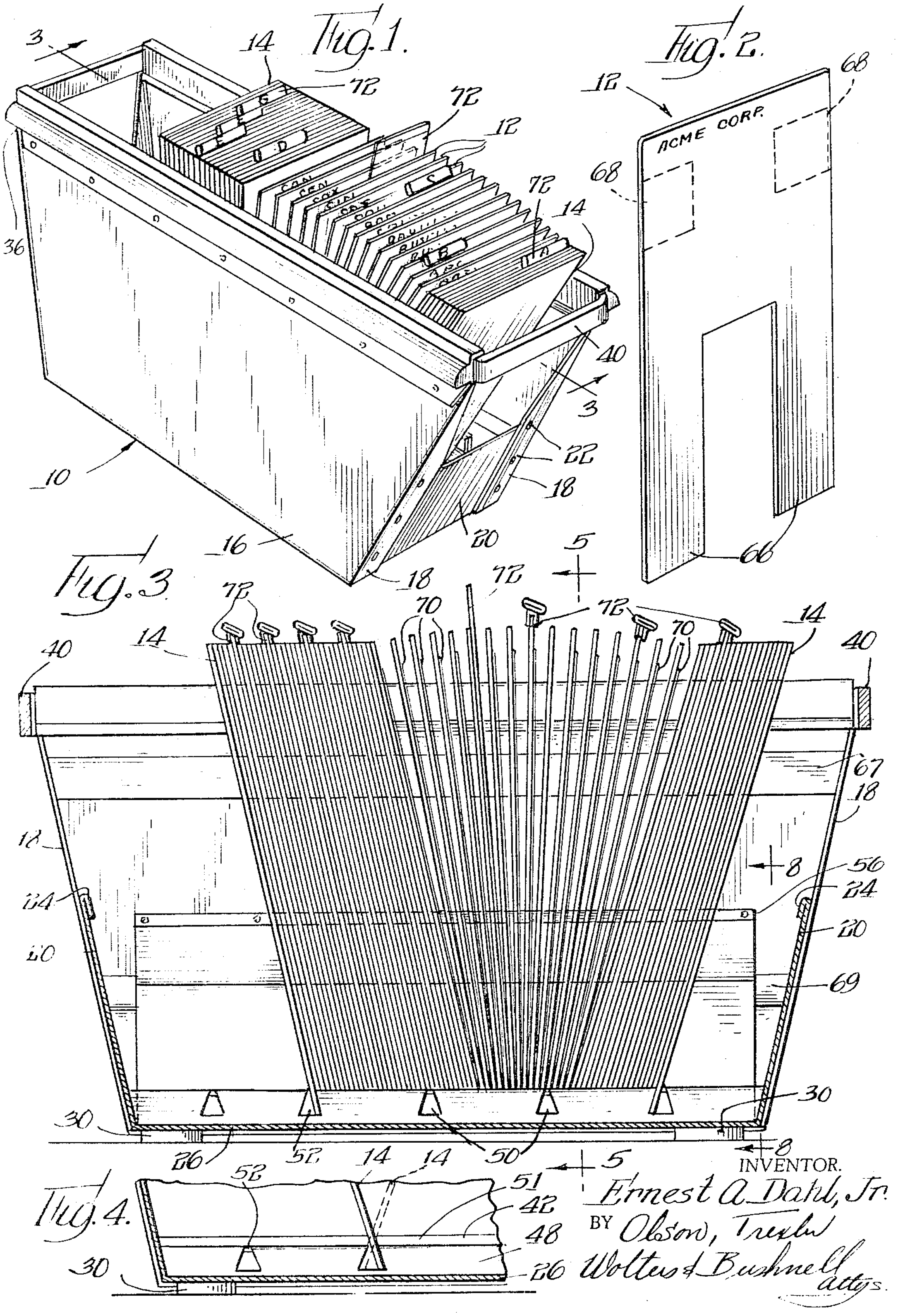
FIGURE 1 is a perspective view of tape file apparatus constructed in accordance with and embodying the principles of the present invention.
FIG. 2 is an enlarged perspective view of a divider for use in the present invention.
FIG. 3 is a further enlarged, fragmentary, longitudinal sectional view of the file of FIG. 1 taken in the direction of the arrows along the line 3—3 thereof.
FIG. 4 is a fragmentary view in the section of FIG. 3 but on an enlarged scale showing a detail of the lower corner portion of the file of FIG. 1.
Figures 5, 6, 7, 8, 9:
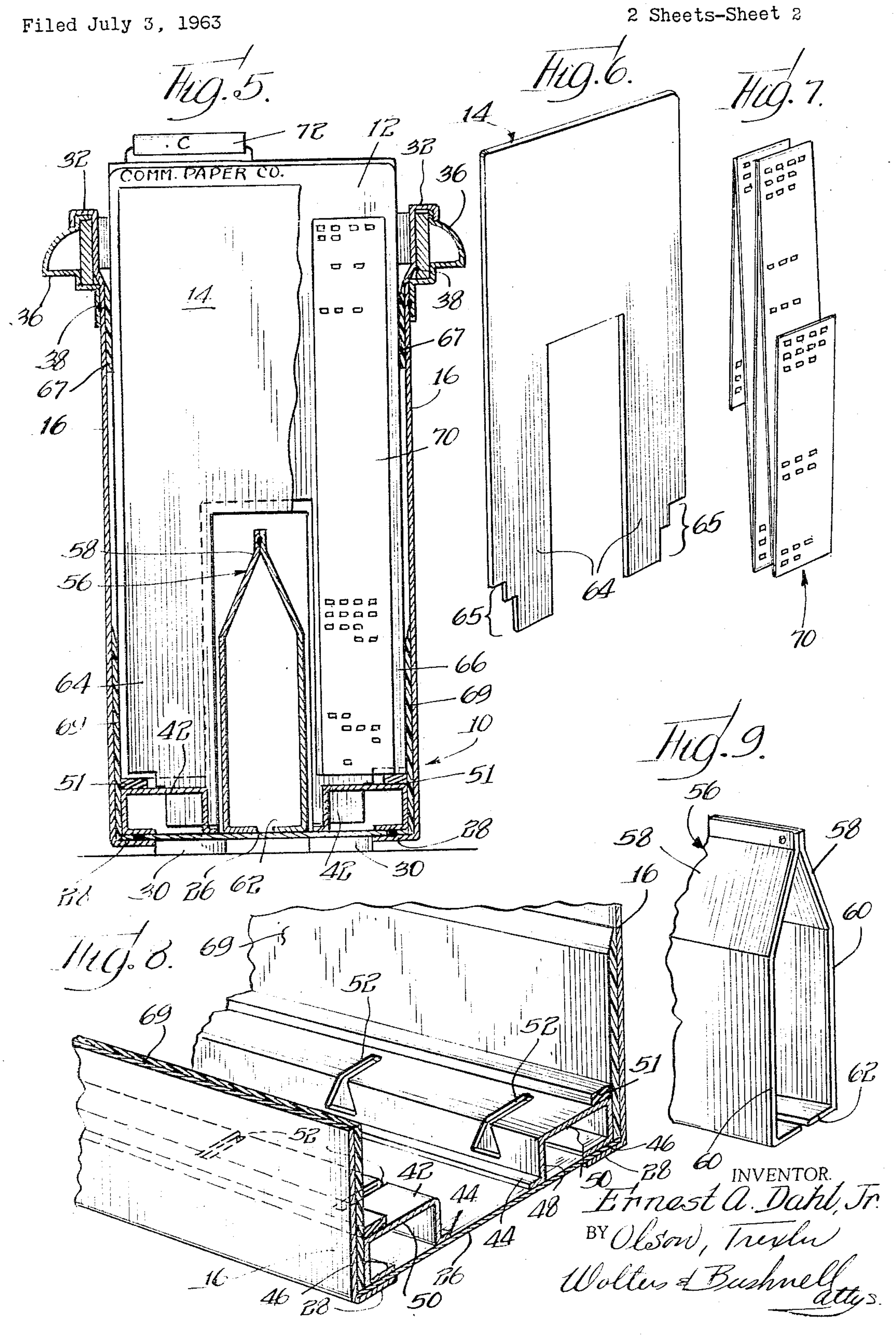
FIG. 5 is a lateral sectional view taken in the direction of the arrows along the line 5—5 in FIG. 3.
FIG. 6 is a perspective view in the scale of FIG. 2 but showing a divider supper of the present invention.
FIG. 7 is a perspective view of a narrow, thin machine-tape.
FIG. 8 is a greatly enlarged, fragmentary perspective view taken generally in the direction of the arrows along the line 8—8 of FIG. 3, certain parts being omitted for purposes of clarity.
FIG. 9 is a view like FIG. 8 showing structure omitted from FIG. 8.

Referring now to the drawings and particularly to FIGS. 1, 3 and 5 there is shown apparatus for filing machine-tapes made in accordance with and embodying the spirit of the present invention. More specifically, the apparatus of the present invention includes a box-like file structure generally designated 10; a plurality of juxtaposed dividers 12; and a spaced pair of divider supports 14.

The container or file 10 is rectangular in plan as well as in lateral cross-section having a laterally spaced pair of longitudinally extending sidewalls 16 the ends of which terminate in vertically extending end-flanges 18 to which are rigidly secured laterally extending end walls 20 by means of, for example, spot welding as at 22 shown in FIG. 1. Referring particularly now to FIG. 3, it will be noted that each end wall 20 extends vertically to about the mid-point of the file 10 and terminates in an inwardly turnover flange 24. The two end walls 20 are integral with a floor panel 26 lying on and rigidly secured to horizontally extending, longitudinal edge flanges 28 bent inwardly from the sidewalls 16, best shown in FIGS. 5 and 8. To preclude marring a surface which supports the file 10 the bottom panel or floor 26 is provided with four cushion elements 30 formed of, for example, felt and each being secured, as by adhesive, adjacent a corner portion of the container 10.

The top longitudinal edge of each sidewall 16 is outwardly and downwardly bent to form a flange 32, clearly shown in FIG. 5. Each flange 32 overlaps the upper portion of a horizontally extending handle member 36, the member 36 extending the full length of the container 10, as shown in FIG. 1. The two side handle members 36 curve smoothly outwardly and downwardly from the respective flanges 32. Within each handle member 36 is disposed a bar magnet structure 38 which magnet structure is polarized laterally thereby presenting on the upper longitudinal portion thereof a field of north polarity and on the lower longitudinal portion thereof a field of south polarity, the purpose of which will be described below.

A substantially U-shaped handle 40, shown in FIG. 1, of aluminum strap or other non-magnetic material may be fitted into each end of the container 10. The strap or handle 40 facilitates carrying the box-like container 10 and also serves to hold the sidewalls 16 in a spaced apart relationship in the top portion thereof.

Turning now to FIGS. 5, 8 and 9 along the bottom of the file 10 there extends longitudinally adjacent each wall 16 a channel element 42. Each channel 42 is secured to the bottom or floor 26 at horizontally disposed bottom flanges 44 and 46 which are bent from the vertical walls or flanges 48 of the channel 42, the flanges 44 being secured to the floor 26 as by spot welding. The upper surface of each channel 42 is defined by a longitudinally extending horizontal web 50.

Near the corner between the web 50 and the sidewall 16 there is disposed an elongated, rectangular strip 51 of resilient material such as, for example, sponge rubber arranged there for purposes of supporting and cushioning the plurality of divider elements 12.

Considering now FIG. 4 and FIG. 8, longitudinally spaced slots 52 are arranged in each channel 42 to receive the lower portion of the divider support 14. Each slot 52 opens into the vertical wall 48 and there defines a triangular cutout so that the divider support 14, its lower portion residing in the slot 52, may be tilted to either side of the vertical wall as indicated by broken lines in FIG. 4, the edges of the cutout serving to arrest the divider support 14.

Spaced between the channels 42 is an upwardly extending central partition 56 extending upwardly from the floor 26, best shown in FIGS. 3 and 5. The central partition 56 terminates vertically at about the level of the sidewall 20 which is equivalent to about the mid-point in height of the container 10.

Outwardly diverging, downwardly sloping guide walls 58 of the partition 56 are united along their upper edges in a central ridge and held securely together as by spot welding. A spaced pair of longitudinally extending wall partition members 60 extend vertically downwardly from the guide walls 58 and terminate in horizontally, inwardly directed flanges 62 rigidly secured to the bottom 26.

Referring to FIG. 1, adjacent each end of the juxtaposed dividers 12 may be arranged a divider support 14 inserted at its lower ends into laterally spaced pair of slots 52 as described above. More specifically referring to FIG. 6, each divider support 14 is generally U-shaped in outline having a recessed central portion so that it may fit over the central partition 56 unobstructedly. Formed preferably of metal, the divider support 14 has a spaced pair of legs 64 which have at their outer lower corners a double-shouldered portion 65 for cooperation with the rubber strip 51 and channel 42. It is contemplated that the divider supports 14 when disposed in the container 10 will be spaced apart a sufficient distance to permit a measure of longitudinal freedom to the plurality of dividers 12 disposed therebetween. It will be noted that the divider supports 14 have a width somewhat less than the dividers 12, clearly shown in FIG. 5.

The divider 12, best shown in FIG. 2, is formed of non-metallic sheet material, preferably of paper card-stock, and is generally U-shaped in outline. The lower portion of the divider 12 includes a spaced pair of legs 66 adapted to be received in the container 10 between the central partition 56 and the sidewall 16, the space between the legs 66 between dimensioned for clearance with the central divider 56 as shown in FIG. 5.

Adjacent each vertical edge of the divider 12 in the upper portion thereof is disposed a magnetically susceptible insert 68 cooperable with magnetic means 38 to induce magnetic repulsion between adjacent dividers 12 to cause a fanning apart of adjacent dividers 12 in a V-shaped formation as shown in FIG. 3, the principle being more fully described in the patent to Ernest A. Dahl, Sr. 2,954,032.

As shown best in FIG. 5 it will be seen that the dividers 12 are of a width somewhat less than that between the sidewalls 16. Top lateral spacer members 67, formed preferably of smooth plastic material, are secured to the sidewalls 16 to maintain the dividers 12 in proper space relationship with respect to the sidewalls 16 as well as the central partition 56. Similarly, bottom lateral spacer members 69 are secured to the sidewalls 16 being maintained in fixed relationship between the sidewalls 69 and the channel 42. The top 67 and bottom 69 spacers extend substantially the full length of the file 10 as shown in FIG. 3. Having a smooth surface the spacers induce little frictional resistance to the fanning action of the dividers 12.

When assembled in the container 10 in straddling relationship with respect to the central partition 56, the plurality of dividers 12 establish a like plurality of tape filing locations. More specifically, the spaced legs 66 of each divider 12 project into a tape-receiving compartment defined by spaced apart walls 60 and 16 of the partition and container respectively. The distance between said walls is at least equal to and approximately that of a machine-tape 70, shown best in FIGS. 5 and 7. As adjacent dividers 12 are caused to fan apart in a V-like opening a pocket-like space between the dividers 12 is opened to receive the tape 70 folded in accordion-fashion. Being that there are two tape-receiving compartments, one on either side of the partition 56, it is contemplated that two tapes may be filed for each divider 12.

For systematic filing and retrieval of the tape 70 it is desirable that the dividers 12 be arranged in some predetermined order, for example, alphabetically. To this end tab equipped separator cards 72 are interspersed at various laterally spaced locations within the divider pack 12. Conventionally, each tab carries an appropriate letter designation. Further, each divider 12 carries along its upper edge portion designating indicia, such as, for example, "Acme Corp." as illustrated in FIG. 2. Thus before the face of the card for the Acme Corp. there will be disposed a pair of tapes relating to a machine program concerning the Acme Corp.

When a tape 70 is removed from its filing location it is desirable that said location be marked so that the tape may be returned without error to its proper location. To this end an out-guide 72 is inserted by the machine operator to the tape pocket. Construction and arrangement of the out-guide 72 is clearly set forth in my co-pending application Serial No. 292,674, filed July 3, 1963.

It is to be understood that the paper tape 70 is formed of rather thin material and is thus quite fragile and may be deformed if not properly handled. When filed in the instant apparatus the likelihood of the tape 70 becoming distorted, wrinkled, or twisted is materially reduced. Further the tape 70 as filed can be readily located and speedily retrieved from its respective tape-receiving location. It has been found that the use of the instant invention has materially reduced the machine operator's time for selecting and refiling a machine-tape 70 and has thus increased operator output per man-hour.

While there has been described what is at present considered to be the preferred embodiment of the invention, it will be understood that various modifications may be made therein, and it is intended to cover in the appended claims all such modifications as fall within the true spirit and scope of the invention.

The invention is claimed as follows:

1. A file for holding machine-tapes, comprising: a box-like container having an open top and including two longitudinally extending sidewalls laterally spaced apart a distance greater than twice the width of folded-machine tapes filed therein; magnet means carried by each sidewall adjacent the top thereof; partition means extending longitudinally along the bottom of said container and spaced from each sidewall a distance greater than the width of a folded machine-tape to divide the lower volume of said container into a plurality of laterally spaced tape-receiving compartments, said partition means terminating substantially below the top of said sidewalls, a plurality of juxtaposed dividers extending laterally between said sidewalls, said plurality of juxtaposed dividers having a body portion and a plurality of depending leg portions, said body portion of each of said juxtaposed dividers being positioned between said sidewalls and above said partition means, said leg portions being positioned to divide each of said tape-receiving compartments into a plurality of tape filing locations for folded machine tapes, each location receiving a single tape, each tape filing location being positioned such that a folded machine tape filed in one of said filing locations contacts adjacent surfaces of the depending leg portions of two of said plurality of juxtaposed dividers, whereby adjacent dividers are positioned close together, said depending leg portions being wider than a folded machine tape to facilitate the filing of a folded machine tape in said file location in a spaced-apart relationship relative to said sidewalls and partition means, each of said juxtaposed dividers being equipped with a spaced pair of magnetically susceptible elements coop· erable with said magnet means to magnetically repel adjacent dividers for permitting access to a folded machine tape filed between adjacent dividers in said tape filing locations.

2. A file for holding machine-tapes, comprising: a box-like container having an open top and including two longitudinally extending sidewalls laterally spaced apart a distance greater than twice the width of folded machine-tapes filed therein; magnet means carried by each sidewall adjacent the top thereof; central partition means extending longitudinally along the bottom of said container and spaced from each sidewall a distance greater than the width of such machine-tape to divide the lower volume of said container into two laterally spaced tape-receiving compartments, said central partition terminating vertically substantially below the top of said sidewalls and having confronting each sidewall a guide surface sloping downwardly towards the adjacent tape-receiving compartment; and a plurality of juxtaposed dividers extending laterally between said sidewalls and across said tape-receiving compartments, said plurality of juxtaposed dividers having a body portion and first and second depending leg portions, said body portion of each of said juxtaposed dividers being positioned between said sidewalls and above said partition means, said first and second leg portions being positioned between a sidewall and said partition means to divide both tape-receiving compartments into a plurality of tape filing locations for folded machine tapes, each location receiving a single tape, each tape filing location being positioned such that a folded machine tape filed in one of said filing locations contacts adjacent surfaces of the depending leg portions of two of said plurality of juxtaposed dividers, whereby adjacent dividers are positioned close together, said depending leg portions being wider than a folded machine tape to facilitate the filing of a folded machine tape in said file location in a spaced-apart relationship relative to said sidewalls and partition means, each divider being equipped with a spaced pair of magnetically susceptible elements cooperable with said magnet means to magnetically repel adjacent dividers for permitting access to tape filed between adjacent dividers in said tape filing locations, the outer edges of said dividers being in contact with antifriction means on said sidewalls to facilitate the movements of said dividers under the effect of said magnet means.

3. A file for holding machine-tapes, comprising: a box-like container having an open top and including two longitudinally extending sidewalls laterally spaced apart a distance greater than twice the width of folded machine-tapes filed therein; magnet means carried by each sidewall adjacent the top thereof; partition means extending longitudinally along the bottom of said container and spaced from each sidewall to divide the lower volume of said container into a plurality of laterally spaced tape-receiving compartments; and a plurality of generally vertically arranged juxtaposed dividers extending laterally between said sidewalls of said container, said plurality of juxtaposed dividers having a body portion and depending leg portions, said body portion of each of said juxtaposed dividers being positioned between said sidewalls and above said partition means, said leg portions being positioned between the walls of said tape-receiving compartments to divide the tape-receiving compartments into a plurality of tape filing locations for folded machine tapes, each location receiving a single tape, each tape filing location being position such that a folded machine tape filed in one of said filing locations contacts adjacent surfaces of the depending leg portions of two of said plurality of juxtaposed dividers, whereby adjacent dividers are positioned close together, said depending leg portions being wider than a folded machine tape to facilitate the filing of a folded machine tape in said file location in a spaced-apart relationship relative to said sidewalls and partition means, each divider having designation indicia on said body portion above said partition means and each divider being equipped with a magnetically susceptible element cooperable with said magnet means to magnetically repel adjacent dividers for exposing said designation indicia and permitting access to tape filed in said tape filing locations between said dividers.

4. A file for holding machine-tapes, comprising: a box-like container having an open top and including two longitudinally extending sidewalls laterally spaced apart a distance greater than twice the width of folded machine-tapes filed therein; magnet means carried by each sidewall adjacent the top thereof; partition means extending longitudinally along the bottom of said container and spaced from each sidewall a distance greater than the width of the folded machine-tape to divide the lower volume of said container into two laterally spaced tape-receiving compartments, said partition terminating vertically substantially below the top of said sidewalls and having confronting each sidewall a guide surface sloping downwardly towards the adjacent tape-receiving compartment; and a plurality of generally vertically arranged juxtaposed dividers extending laterally between said sidewalls of said containers, said plurality of juxtaposed dividers having a body portion and first and second depending leg portions, said body portion of each of said juxtaposed dividers being positioned between said sidewalls and above said partition means, said first and second leg portions being positioned between a sidewall and said partition means to divide both tape-receiving compartments into a plurality of tape filing locations for folded machine tapes, each location receiving a single tape, each tape filing location being positioned such that a folded machine tape filed in one of said filing locations contacts adjacent surfaces of the depending leg portions of two of said plurality of juxtaposed dividers, whereby adjacent dividers are positioned close together, said depending leg portions being wider than a folded machine tape to facilitate the filing of a folded machine tape in said file location in a spaced-apart relationship relative to said sidewalls and partition means, each divider having thereon designating indicia and being equipped with a spaced pair of magnetically susceptible elements cooperable with said magnet means to magnetically repel adjacent dividers to expose said designating indicia and permit access to tape filed at said tape filing locations between adjacent dividers, the outer edges of said dividers being in contact with antifriction means connected to said sidewalls to facilitate the movement of said dividers under the effect of said magnet means.

References Cited by the Examiner

UNITED STATES PATENTS

| | | | |
|---|---|---|---|
| 664,501 | 12/1900 | Rand | 129—16 |
| 1,264,824 | 4/1918 | Linsley | 129—16 |
| 1,332,954 | 3/1920 | Ringler | 129—16.5 |
| 1,467,644 | 9/1923 | McKee | 129—16 |
| 1,692,231 | 11/1928 | Thompson | 129—16 |
| 2,341,639 | 2/1944 | Mathiesen | 129—16 |
| 2,485,519 | 10/1949 | Wardy | 129—16 |
| 2,893,565 | 7/1959 | Weston et al. | 129—16.7 |
| 2,954,032 | 9/1960 | Dahl | 129—16 |
| 3,033,208 | 5/1962 | Mathiesen | 129—16 |

JEROME SCHNALL, *Primary Examiner.*